United States Patent
Green et al.

(10) Patent No.: US 9,990,680 B2
(45) Date of Patent: Jun. 5, 2018

(54) IDENTIFYING GROUPS FOR A SOCIAL NETWORKING SYSTEM USER BASED ON INTERACTIONS BY THE USER WITH VARIOUS GROUPS

(71) Applicant: Facebook, Inc., Menlo Park, CA (US)

(72) Inventors: Bradley Ray Green, Snohomish, WA (US); Li Ju, Issaquah, WA (US); Yi Miao, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days. days.

(21) Appl. No.: 15/601,107

(22) Filed: May 22, 2017

(65) Prior Publication Data
US 2017/0256002 A1    Sep. 7, 2017

Related U.S. Application Data

(63) Continuation of application No. 14/750,494, filed on Jun. 25, 2015, now Pat. No. 9,747,649.

(51) Int. Cl.
*G06Q 50/00* (2012.01)
*H04L 12/58* (2006.01)

(52) U.S. Cl.
CPC ............. *G06Q 50/01* (2013.01); *H04L 51/32* (2013.01)

(58) Field of Classification Search
None
See application file for complete search history.

(56) References Cited

U.S. PATENT DOCUMENTS

| | | |
|---|---|---|
| 9,183,259 B1 | 11/2015 | Marra et al. |
| 2010/0076850 A1 | 3/2010 | Parekh et al. |
| 2011/0022602 A1 | 1/2011 | Luo et al. |
| 2011/0246907 A1 | 10/2011 | Wang et al. |
| 2012/0290660 A1 | 11/2012 | Rao et al. |
| 2013/0006879 A1 | 1/2013 | Ramanathan et al. |
| 2014/0067967 A1 | 3/2014 | Jackson et al. |
| 2014/0108562 A1* | 4/2014 | Panzer ............... G06Q 50/01 709/206 |
| 2015/0356570 A1 | 12/2015 | Goldsmid et al. |
| 2016/0070770 A1* | 3/2016 | He ................ G06F 17/30958 707/742 |

OTHER PUBLICATIONS

United States Office Action, U.S. Appl. No. 14/750,494, dated Jan. 3, 2017, 12 pages.

* cited by examiner

*Primary Examiner* — Thomas Dailey
(74) *Attorney, Agent, or Firm* — Fenwick & West LLP

(57) ABSTRACT

A social networking system selects a set of groups for presentation to a user of the social networking system. To select groups, the social networking system determines scores for various groups representing a likelihood of the user interacting with the groups. The social networking system may identify a set of groups based on interactions between the user and various groups occurring during a specific time interval and determine scores for groups in the set. When determining a score for a group, the social networking system accounts for times associated with interactions between the user and various groups. Based on the scores, one or more groups are selected and presented to the user. Additionally, the social networking system may identify a time to present the selected one or more groups to the user based on prior user interactions with various groups.

20 Claims, 3 Drawing Sheets

IDENTIFYING GROUPS FOR A SOCIAL NETWORKING SYSTEM USER BASED ON INTERACTIONS BY THE USER WITH VARIOUS GROUPS

CROSS REFERENCE TO RELATED APPLICATIONS

This application is a continuation of co-pending U.S. application Ser. No. 14/750,494, filed Jun. 25, 2015, which is incorporated by reference in its entirety.

BACKGROUND

This disclosure relates generally to social networking systems, and more specifically to identifying groups of users to a social networking system user.

An online system, such as a social networking system, allows its users to connect to and communicate with other online system users. Users may create profiles on an online system that are tied to their identities and include information about the users, such as interests and demographic information. The users may be individuals or entities such as corporations or charities.

Additionally, a social networking system may maintain groups of users, allowing a user to provide content to a group for presentation to each user included in the group. A group may be associated with a topic, a location, or with any other suitable characteristic, so a user included in the group may more easily view or share content associated with the characteristic associated with the group. However, as a social networking system may maintain a large number of groups, a user may expend significant time identifying groups associated with characteristics of interest to the user. This decreases the likelihood of the user identifying groups of interest to the user, which may decrease the amount of interaction between the user and the social networking system.

SUMMARY

Users of a social networking system communicate messages or other content to each other via the social networking system. To simplify communication of content, the social networking system may maintain various groups each including one or more users of the social networking system. A user may communicate content to a group, which causes the social networking system to present the content to the users included in the group. A user may provide content to a group including the user for distribution to other users in the group or may view or otherwise access content associated with the including the user.

To allow a user to more easily identify a group of interest to the user, the social networking system determines a score for various groups maintained by the social networking system. The social networking system may identify a set of groups as groups with which the user has at least a threshold likelihood of interacting within a time interval and determine scores associated with each group. For example, the set of groups includes groups with which the user has at least a threshold likelihood of interacting during a 24-hour interval. In various embodiments, the social networking system identifies interactions between the user and various groups associated with times within a threshold time interval of a current time and determines likelihoods of the user interacting with groups based on the identified interactions, allowing the social networking system to account for recent interactions with groups by the user when identifying the set of groups. Additionally, when identifying the set of groups, the social networking system excludes groups that the user left within a threshold time interval of a current time or groups from which the user was removed within the threshold time interval from the set based on interactions between the user and groups.

To determine the likelihood of a user's interacting with a group within the time interval, the social networking system identifies characteristics associated with the group (e.g., a topic associated with the group, a location associated with the group, etc.) and identifies one or more groups with which the user previously interacted and having characteristics matching, or similar to, the characteristics associated with the group. Based on one or more types of interactions between the user and the identified groups (e.g., interactions where the user accessed content associated with one or more of the identified groups, interactions where the user provided content to one or more of the identified groups, interactions where the user joined an identified group, interactions where the user left an identified group), the social networking system determines the likelihood of the user's interacting with the group. For example, the social networking system applies a model to various interactions between the user and one or more of the identified groups to determine a frequency with which the user performs an interaction with the identified groups. In some embodiments, the model associates weights with various interactions based on times associated with the interactions. The likelihood of the user's interacting with the group during a time interval is based on the determined frequency, and if the likelihood is at least a threshold value, the social networking system includes the group in the set of groups. Characteristics of the group and the one or more identified groups having matching or similar characteristics of the group may also be used to determine the likelihood of the user interacting with the group during the time interval.

A score for a group is based on a model that determines a likelihood of the user interacting with the group within a specified time interval. For example, the score associated with the group represents a likelihood of the user interacting with the group during a 24-hour interval. Various interactions between the user and other groups maintained by the social networking system are used to determine the score for a group. For example, the user's interactions with groups having at least a threshold number of characteristics matching or similar to a group are used to determine the score for the group. Examples of interactions used to determine the score for a group include the user providing one or more content items to an additional group with similar characteristics to the group for presentation to users associated with the additional group, the user commenting on content items associated with an additional group with similar characteristics to the group, the user sharing content items associated with an additional group having similar characteristics to the group, and the user indicating a preference for a content item associated with an additional group having similar characteristics to the group, the user joining an additional group having similar characteristics to the group, the user leaving an additional group having similar characteristics to the group, the user hiding information describing an additional group having similar characteristics to the group, or other suitable interactions. Additionally, the score associated with the group is based in part on interactions where the user accessed content items associated with one or more groups having similar characteristics to the group. For example, if the user views a content item associated with an additional group having similar characteristics to the group for at least a threshold length of time, the social networking system identifies an interaction where the user has viewed the content item. A frequency with which the user interacts with additional groups having similar characteristics to the group (e.g., views content items associated with groups having similar characteristics to the group, views content items associated with groups having similar characteristics to the group, joins groups having similar characteristics to the group, leaves groups having similar characteristics to the group) is used to determine the score for the group. Accounting for interactions where the user provides content to groups as well as interactions where the user passively views content associated with groups increases the likelihood of the social networking system identifying a group with which the user is likely to interact, even by passively consuming content items associated with the group.

Based on the scores associated with various groups, the social networking system selects one or more groups for identification to the user. For example, the social networking system ranks groups based on their associated scores and selects one or more groups having at least a threshold position in the ranking. Alternatively, the social networking system selects one or more groups associated with at least a threshold score. Information describing the selected groups is communicated from the social networking system to a client device associated with the user. The information may be presented in an order based at least in part on the scores associated with selected groups to allow the user to more easily identify selected groups with higher scores, which increases the likelihood of the user identifying a group with which the user will subsequently interact.

In some embodiments, the social networking system determines a time to send information identifying selected groups to a user based on prior interactions between the user and various groups. For example, if the user has performed certain interactions (e.g., joined groups, left groups, hid information describing groups) with at least a threshold number of groups within a threshold time interval of a current time, the social networking system delays communication of information describing selected groups to the user, so the information identifying the selected groups is presented to the user at a time when the user is more likely to interact with the information describing the selected groups. The threshold number of groups may or the threshold time interval may be modified by the social networking system over time based on interactions between the user and additional groups or based on interactions between additional users and various groups.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
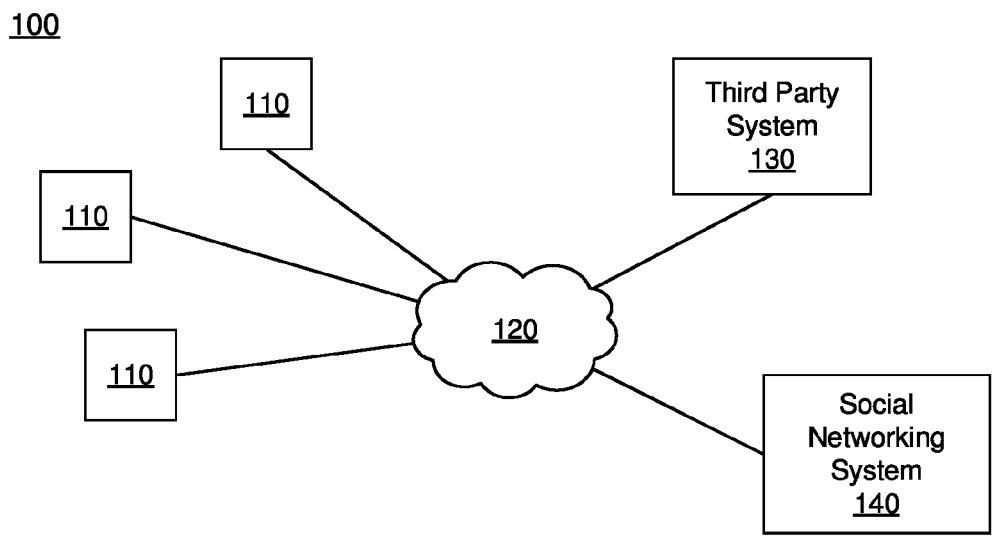
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third-party systems 130, one or more machines 135, and the social networking system 140. In alternative configurations, different and/or additional components may be included in the system environment 100. The embodiments described herein may be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
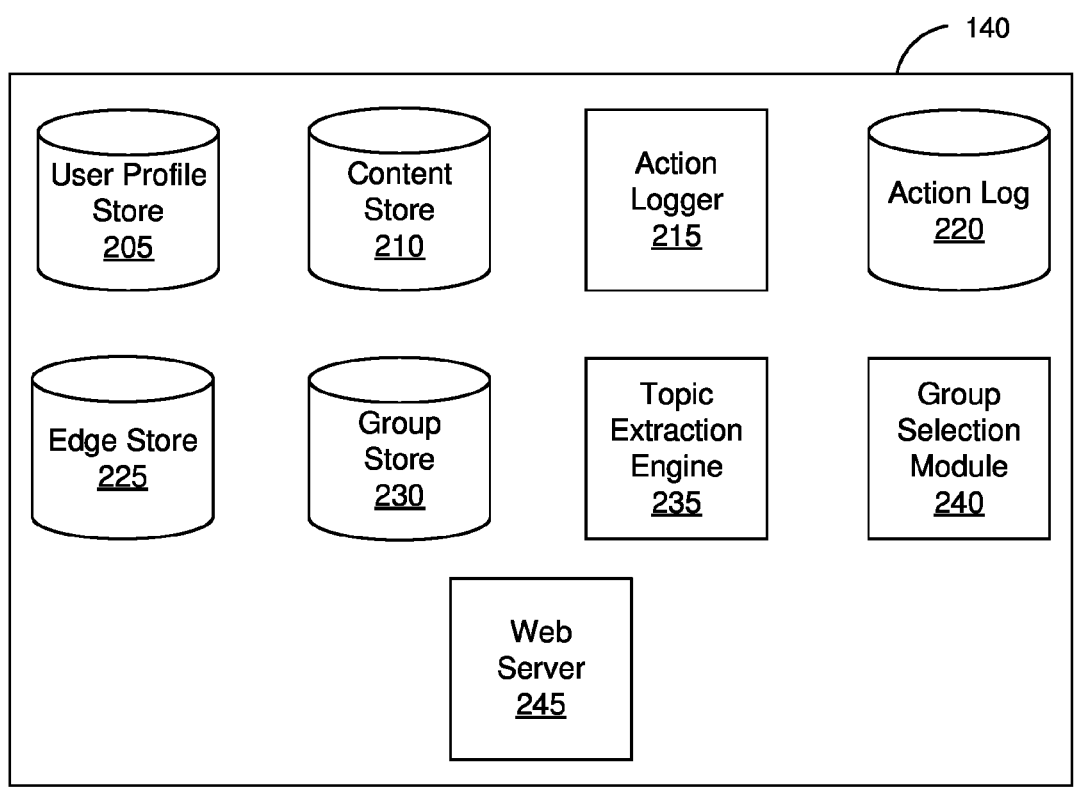
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a group store 230, a topic extraction engine 235, a group selection module 240 and a web server 245. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), or any other type of content. Online system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." A content identifier is associated with each content item to allow the social networking system 140 to more easily identify and retrieve various content items. Hence, online system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences. Additionally, the action log 220 associates a time with actions or interactions associated with various users in various embodiments. For example, an interaction is associated with a time when the action logger 215 received information identifying the interaction or is associated with a time when the online system 140 performed the interaction or action, allowing the action log 220 to maintain a record of interactions as the interactions occur, so real-time or near-real time information describing interactions by a user is maintained in the action log 220.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. An edge between a user and another user may be associated with a connection strength specified by the user and providing information about a relationship between the user and the other user. For example, connections between a user and other users with which the user has a close relationship, such as family members, have relatively high connection strengths, while connections between the user and additional users with which the user has a more distant relationship have lower connection strengths. In some embodiments, a user selects from connection strengths associated with different types of relationships (e.g., family members, co-workers, friends, partners, etc.) when specifying a connection with another user, and the edge store 225 associates a selected connection strength with an edge describing the connection. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or in another user in the social networking system 140 based on the actions performed by the user. A user's affinity may be computed by the social networking system 140 over time to approximate a user's interest in an object, a topic, or another user in the social networking system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The group store 230 includes information identifying various groups of users. A group is associated with a group identifier stored by the group score 230 that uniquely identifies the group. One or more identifiers associated with users are associated with the group identifier to identify users of social networking system 140 included in the group. Other information may be associated with a group identifier, such as a name identifying a group corresponding to the group identifier, a description associated with the group, descriptive information associated with the group (e.g., a location), or other suitable information. Additionally, one or more content identifiers specifying content items are associated with a group identifier to identify content items associated with a group associated with the group identifier. If a content item, such as a message, is communicated to a group, the message is communicated to users associated with the group. Hence, maintaining a group allows content to be more easily communicated to users within the group by allowing content to be communicated to the group rather than communicated to various individual users. A group may be generated by a user of the social networking system 140 identifying users associated with the group or the social networking system 140 may generate one or more groups based on characteristics associated with users of the social networking system 140. Additionally, a user's interactions with a group are identified in the action log 220 or in the group store 230 by associating a group identifier with information describing an interaction with the group.

The social networking system 140 includes a topic extraction engine 235, which identifies one or more topics associated with objects in the content store 210 or with groups in the group store 230. To identify topics associated with content items, the topic extraction engine 235 identifies anchor terms included in a content item and determines a meaning of the anchor terms as further described in U.S. application Ser. No. 13/167,701, filed Jun. 24, 2011, which is hereby incorporated by reference in its entirety. For example, the topic extraction engine 235 determines one or more topics associated with a content item maintained in the content store 210. The one or more topics associated with a content item are stored and associated with an object identifier corresponding to the content item. In various embodiments, associations between object identifiers and topics are stored in the topic extraction engine 240 or in the content store 210 to simplify retrieval of one or more topics associated with an object identifier or retrieval of object identifiers associated with a specified topic. Structured information associated with a content item may also be used to extract a topic associated with the content item.

To identify topics associated with a group, the topic extraction engine 235 identifies content items associated with the group based on information included in the group store 230 and determines topics associated content items associated with the group based on anchor terms included in the content items as described above. In one embodiment, the topic extraction engine 235 associates topics with a group that are associated with at least a threshold number or threshold percentage of content items associated with the group. Alternatively, the topic extraction engine ranks topics based on a frequency with which the topics are associated with content items associated with a group and associates topics having at least a threshold position in the ranking with the group. Topics associated with a group may be stored in the group store 230 along with the group's group identifier.

The group selection module 240 identifies one or more groups having at least a threshold likelihood of being relevant to a user, allowing the user to more easily identify groups associated with content with which the user is likely to interact or groups including users with which the user is likely to interact of interest. Identifying groups for a user allows the social networking system 140 to encourage the user to interact with a broader range of content items or users, which increases the amount of interaction between the user and the social networking system 140. In one embodiment, the group selection module 240 determines a score for various groups, where a score for a group is based on a model determining a likelihood of the user interacting with the group within a specified time interval. A score for a group is based on a model determining a likelihood of the user interacting with the group within a specified time interval. Various interactions between the user and other groups maintained by the social networking system are used to determine the score for a group. For example, the user's interactions with groups having at least a threshold number of characteristics matching or similar to a group are used to determine the score for the group. Examples of interactions used to determine the score for a group include the user providing one or more content items to an additional group with similar characteristics to the group for presentation to users associated with the additional group, the user commenting on content items associated with an additional group with similar characteristics to the group, the user sharing content items associated with an additional group having similar characteristics to the group, and the user indicating a preference for a content item associated with an additional group having similar characteristics to the group.

Additionally, the score associated with the group is based in part on interactions where the user accessed content items associated with one or more groups having similar characteristics to the group. For example, if the user views a content item associated with an additional group having similar characteristics to the group for at least a threshold length of time, the social networking system identifies an interaction where the user has viewed the content item. A frequency with which the user views content items associated with groups having similar characteristics to the group or a number of times the user views content items associated with groups having similar characteristics to the group is used when determining the score for the group. Accounting for interactions where the user provides content to groups as well as interactions where the user passively views content associated with groups increases the likelihood of the group selection module 240 identifying a group with which the user is likely to interact by accounting for a broader range of interactions when determining scores for groups.

Based on the scores associated with various groups, the group selection module 240 selects one or more groups for identification to the user. For example, the group selection module 240 ranks groups based on their associated scores and selects one or more groups having at least a threshold position in the ranking. Alternatively, the group selection module 240 selects one or more groups associated with at least a threshold score. Information describing the selected groups is communicated from the social networking system 140 to a client device 110 associated with the user. The information may be presented in an order based at least in part on the scores associated with selected groups to allow the user to more easily identify selected groups with higher scores, which increases the likelihood of the user identifying a group with which the user will subsequently interact.

In some embodiments, the group selection module 240 applies one or more rules when selecting groups to select groups satisfying different criteria. For example, the group selection module 240 identifies multiple sets of groups form the group store 230 using various criteria, with each set including groups satisfying one or more criteria associated with the set. Example criteria associated with a set include: a location, a user, information describing additional social networking system users, types of connections between the user and additional users, or any other suitable information. For example, a set includes groups associated with a location specified by criteria associated with the set or a set includes groups including users having a specific type of connection to a user specified by criteria associated with the set. When selecting the groups, the group selection module 240 applies one or more rules specifying a minimum number of criteria associated with different sets. Alternatively, scores associated with a group may be modified based on criteria associated with a set including the group and criteria associated with sets including previously selected groups. For example, if a group is included in a set that also includes at least a threshold number of previously selected groups, the score of the group is decreased or a position of the group in a ranking is reduced. Alternatively, the group selection module 240 ranks candidate groups based on their associated scores and penalizes a ranking of a candidate group if it is included in a set that also includes another candidate group having a higher ranking than the group. As another example, the group selection module 240 generates different rankings for each set of groups, with a ranking for a set based on scores of groups included in the set. A threshold number of groups are selected from at least a threshold number of sets, based on the ranking for each set, to provide the user with different groups associated with different characteristics.

The group selection module 240 accounts for times associated with various interactions between a user and groups when selecting groups for the user. For example, interactions stored in the action log 220 are associated with a time, such as a time when the action logger 215 received the interaction or a time when the social networking system 140 performed the interaction. When identifying groups to a user, the group selection module 240 accounts for times associated with interactions between the user and various groups. For example, the group selection module 240 determines likelihoods of the user interacting with various groups based on interactions between the user and groups that are associated with times within a threshold time interval from a current time. Additionally, when determining scores associated with groups, the group selection module 240 weights various interactions based at least in part on a difference between times associated with the interactions and the current time. Further, the group selection module 240 may determine when to communicate information identifying selected groups to a user based on interactions by the user with other groups. For example, if the user has performed certain interactions (e.g., joined groups, left groups, hid information describing groups) with at least a threshold number of groups within a threshold time interval of a current time, the group selection module 240 delays communication of information describing selected groups to the user, so the information identifying the selected groups is presented to the user at a time when the user is more likely to interact with the information describing the selected groups. The threshold number of groups or the threshold time interval may be modified by the social networking system over time based on interactions between the user and additional groups or based on interactions between additional users and various groups. Selection of groups is further described below in conjunction with FIG. 3.

The web server 245 links the social networking system 140 via the network 120 to the one or more client devices 110, as well as to the one or more third party systems 130. The web server 245 serves web pages, as well as other content, such as JAVA®, FLASH®, XML and so forth. The web server 245 may receive and route messages between the social networking system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Identifying Groups for Recommendation to a Social Networking System User

Figure 3:
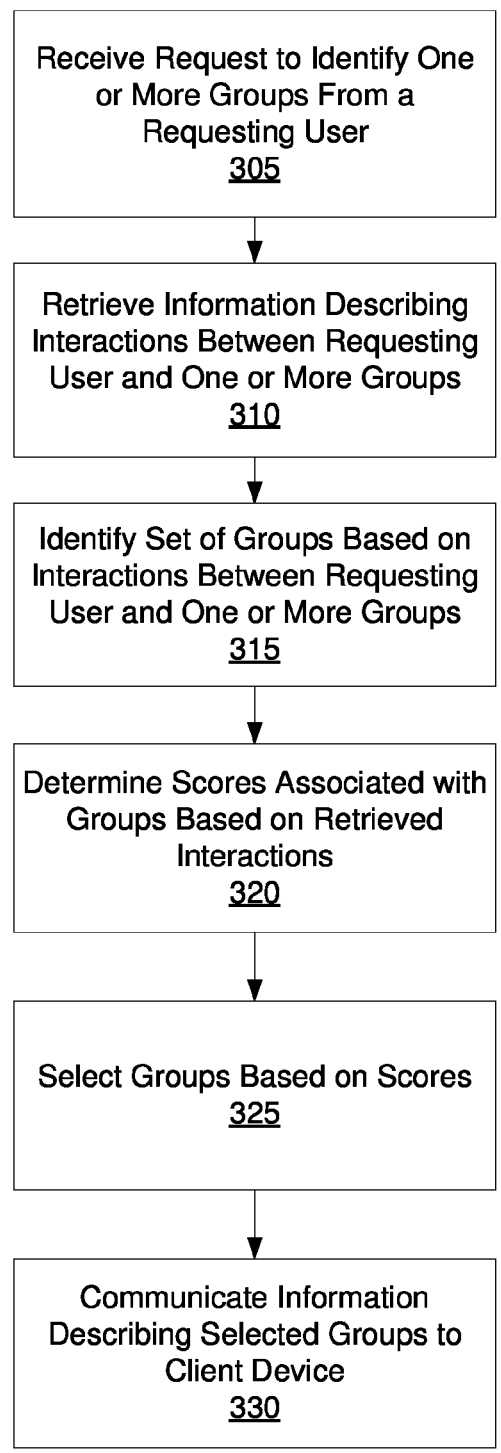
FIG. 3 is a flowchart of a method for identifying groups of users to a requesting user of a social networking system, in accordance with an embodiment.

FIG. 3 is a flowchart of one embodiment of a method for identifying groups of users to a requesting user of a social networking system 140. In other embodiments, the method may include different and/or additional steps than those shown in FIG. 3. Additionally, steps of the method may be performed in different orders than the order described in conjunction with FIG. 3.

The social networking system 140 stores information identifying various groups of users. As described above in conjunction with FIG. 3, a group includes a plurality of users of the social networking system 140 and is associated with a group identifier uniquely identifying the group. One or more identifiers are associated with a group identifier to identify users of social networking system included in the group corresponding to the group identifier. Other information may be associated with a group identifier, such as a name identifying a group corresponding to the group identifier, a description associated with the group, descriptive information associated with the group (e.g., a location), topics associated with the group, a user that created the group, or other suitable information. As described above in conjunction with FIG. 2, one or more content identifiers specifying content items are associated with a group identifier to identify content items associated with a group associated with the group identifier. A group may be generated by a user of the social networking system 140 identifying users associated with the group or the social networking system 140 may generate one or more groups based on characteristics associated with users of the social networking system 140. Interactions associated with a group, such as interactions between various users and the group, are also stored by the social networking system 140 by associating the group identifier with a description of an interaction along with user identifiers of one or more users associated with the interaction.

Additionally, the social networking system 140 stores information describing interactions between users of the social networking system 140 and various groups. The stored information includes a time associated with each interaction between users and groups. For example, an interaction where a user joins a group is stored along with a time when the social networking system 140 received the interaction for the user to join the group. As another example, an interaction where a user exited a group or was removed from a group (by an administrator or other user in the group) is stored along with a time when the social networking system 140 received the interaction. However, information describing other interactions may also be stored by the social networking system 140. Example interactions between a user and a group include: indicating a preference for a content item associated with the group, sharing a content item associated with the group with one or more additional users, accessing a content item associated with the group for at least a threshold amount of time, accessing at least a threshold amount of content associated with the group, or any other suitable interactions. In various embodiments, the social networking system 140 stores a time when the social networking system 140 received an interaction by a user with a group, allowing the social networking system 140 to store information describing interactions by the user with the group in real-time or in near real-time.

The social networking system 140 receives 305 a request to identify one or more groups from a requesting user of the social networking system 140. For example, the request is a search query including one or more search terms compared to information associated with groups by the social networking system 140. Alternatively, the request is a request for content to be presented to the requesting user. As another example, the request is a more general request from the requesting user to identify one or more groups with which the user is not currently associated. The request includes information identifying the requesting user, such as a user identifier associated with the requesting user, and may also include one or more characteristics of groups specified by the requesting user (e.g., location, topic, connection between the requesting user and users associated with the group).

Using information identifying the requesting user from the request, the social networking system 140 retrieves 310 information describing interactions between the requesting user and one or more groups. For example, the social networking system 140 retrieves interactions where the requesting user joined a group, interactions where the requesting user left a group, or interactions where the requesting user was removed from a group. As another example, the social networking system 140 retrieves 310 information describing interactions where the requesting user provided content to one or more groups. Interactions, or actions, associated with a user identifier of the requesting user, associated with a group identifier, and specifying one or more types of interactions are identified 310. An interaction where the requesting user provided content to the group may be any interaction where the requesting user provided the social networking system 140 with content that is associated with a group. Example interactions where the requesting user provided content to a group include: the requesting user providing a content item to a group, the requesting user indicating a preference for a content item associated with a group, the requesting user sharing a content item associated with a group with one or more additional users, the requesting user checking-in to an event associated with a group, the requesting user communicating a request to join a group to another user or any other suitable interaction.

Similarly, the social networking system 140 retrieves 310 interactions associated with the requesting user where the requesting user accessed content associated with a group. The social networking system 140 stores information describing additional types of interactions where users viewed content associated with a group, allowing the social networking system 140 to maintain information describing passive interaction with content associated with various groups. For example, the social networking system 140 stores an interaction associated with a user and with a group when the user accesses a content item associated with the group via a client device 110 for at least a threshold length of time or stores an interaction when at least a threshold amount of a content item associated with a group is presented by a client device 110. In various embodiments, an application associated with the social networking system 140 and executing on a client device 110 communicates a user identifier, a content item identifier, and description of an interaction to the social networking system 140 when the user accesses content for a threshold time interval or views at least a threshold amount of a content item. The social networking system 140 stores the descriptions (e.g., in the action log 220) to maintain information describing users accessing or viewing content items.

The retrieved interactions include interactions between the requesting user and information describing a group in various embodiments. For example, the social networking system 140 retrieves 310 interactions where the requesting user hid information describing a group, such as a recommendation to join the group. As another example, the social networking system 140 retrieves 310 interactions where the requesting user indicated a preference for a description of a group, saved a description of a group for further review, or shared a description of a group with another user.

Based on the retrieved interactions and times associated with the retrieved interactions, the social networking system identifies 315 a set of groups with which the requesting user has at least a threshold likelihood of interacting within a time interval from the groups. For example, the set of groups includes groups with which the user has at least a threshold likelihood of interacting during a 24 hour interval. To determine the likelihood of a user interacting with a group within the time interval, the social networking system 140 identifies characteristics associated with the group (e.g., a topic associated with the group, a location associated with the group, etc.) and identifies one or more groups with which the user previously interacted having characteristics matching, or similar to, the characteristics associated with the group as well as the times when the user performed the interactions with the one or more groups. In some embodiments, the social networking system 140 identifies interactions between the user and groups having characteristics matching, or similar to, characteristics associated with a group that are associated with times within a threshold time interval of a current time. Based on the identified interactions, the social networking system 140 determines the likelihood of the user interacting with the group, as further described below. Accounting for times associated with interactions between a user and various groups allows the social networking system 140 to identify 315 the set of groups based on the most recent interactions by the user, increasing the likely relevance of the identified groups to the user.

Additionally, when identifying 315 the set of groups, the social networking system 140 accounts for certain types of interactions between the requesting user and various groups, such as interactions between the requesting user and a group indicating a lack of interest by the requesting user in the group. In one embodiment, the social networking system excludes a group associated with an interaction where the requesting user left the group or was removed from the group from the set of groups. For example, if the requesting user left a group or was removed from a group within a threshold time interval of a current time, the social networking system 140 excludes the group from the set. Similarly, if the requesting user hid or deleted information describing a group within a threshold time interval of the current time, the social networking system 140 excludes the group from the set. Excluding groups in which the requesting user has indicated a lack of interest from the set of groups increases the likelihood of the set including groups likely to be relevant to the requesting user.

Based on interactions between the requesting user and groups having characteristics matching, or similar to, characteristics of an identified group (e.g., interactions where the requesting user accessed content associated with additional groups having characteristics matching, or similar to, the group, interactions where one or more of the identified groups and interactions where the requesting user provided content to one or more of the additional groups, interactions where the requesting user joined an additional group, interactions where the requesting user left an additional group, etc.), the social networking system 140 determines the likelihood of the requesting user interacting with the group. For example, the social networking system 140 applies a model to the retrieved interactions to determine a frequency with which the user performs an interaction with groups having characteristics matching, or similar to, characteristics of a group. The likelihood of the user interacting with the group during a time interval is based on the determined frequency, and if the likelihood is at least a threshold value, the social networking system 140 includes the group in the set of groups. Characteristics of the group and the one or more identified groups having matching or similar characteristics of the group may also be used to determine the likelihood of the user interacting with the group during the time interval. For example, a number or percentage of characteristics of an identified group matching characteristics of the group is used to weight interactions between the user and the identified group when determining the likelihood of the user interacting with the group during the time interval. In some embodiments, the model associates weights with various interactions based at least in part on times associated with interactions between the user and various groups. For example, the model associates higher weights with interactions associated with more recent times (e.g., interactions associated with times within a threshold time of a current time) than with interactions associated with older times.

The social networking system 140 also determines 320 scores associated with groups in the set of groups, where a score associated with a group indicates a likelihood of the requesting user interacting with the group (e.g., providing content to the group, accessing content associated with the group, joining the group, or performing one or more other suitable interactions with the group). In various embodiments, the social networking system 140 selects a group from the set, determines one or more characteristics associated with the selected group, and identifies one or more additional groups having at least a threshold number or percentage of characteristics matching, or similar to, characteristics associated with the selected group. Example characteristics associated with a group include: one or more topics associated with the group, a location associated with the group, users associated with the group, a user creating the group, and connections between the requesting user and users associated with the group. A model that associates values with different types of interactions is applied to interactions between the requesting user and the one or more additional groups to determine 320 a score providing a measure of the likelihood of the requesting user interacting with the selected group based on the values. In different embodiments, values associated with different types of interactions may be differently weighted, so different types of interactions differently contribute to the score associated with a group. Additionally, the model may weight values associated with interactions between the requesting user and various groups based on a number or percentage of characteristics of an additional group associated with an interaction matching or similar to characteristics of the selected group when determining the likelihood of the user interacting with the selected group. Times associated with interactions between the requesting user and the additional groups may also be used by the model to associate weights with various interactions when determining the likelihood of the user interacting with the group. Prior interactions between the requesting user and the selected group, if any, may also be used by the model when determining 320 the score associated with the selected group, and may be weighted higher than interactions between the requesting user and an additional group having characteristics matching, or similar to, the selected group. For example, interactions between the requesting user and information describing the selected group (e.g., the requesting user hiding information describing the selected group, the requesting user leaving the selected group) are weighted higher than interactions by the requesting user with an additional group having characteristics matching, or similar to, the selected group.

Based on the scores associated with groups in the set of groups, the social networking system 140 selects 325 one or more groups from the set. In one embodiment, the social networking system 140 ranks groups in the set of groups based on their associated scores and selects 325 groups having at least a threshold position in the ranking. Alternatively, the social networking system 140 selects 325 one or more groups associated with at least a threshold score.

When selecting 325 the one or more groups, the social networking system 140 may also account for one or more characteristics of groups in the set of groups, so groups having a variety of characteristics are selected 325. For example, the social networking system 140 applies one or more rules to groups in the set, with different rules specifying criteria based on different characteristics of groups. In one embodiment, if a threshold number of groups having a characteristic are selected 325, scores associated with other groups having the characteristic are reduced, or positions of other groups having the characteristic in the ranking of groups are reduced, to decrease the likelihood that additional groups having the characteristic are selected 325. An amount by which the scores or positions of other groups having the characteristic are decreased may be based on a number of previously selected groups having the characteristic. Alternatively, scores or positions in the ranking associated with groups that have not previously been selected 325, or have not been selected 325 within a threshold time interval, are increased.

Figure 4:
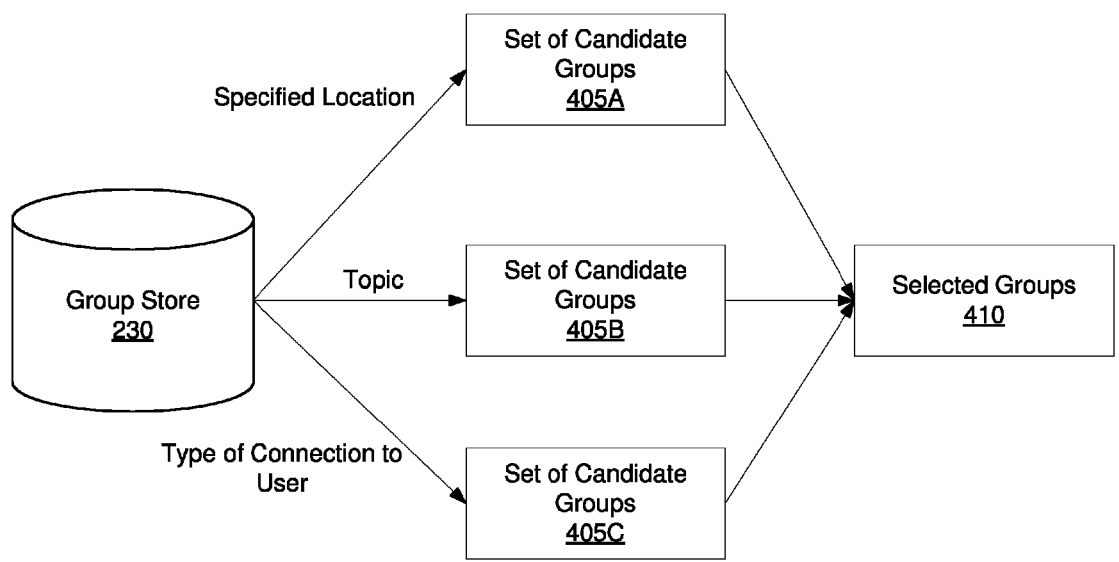
FIG. 4 is a process flow diagram of the social networking system identifying sets of candidate groups from stored groups, in accordance with an embodiment.

In one embodiment, the social networking system 140 identifies multiple sets of candidate groups from the set, with each set of candidate groups associated with one or more criteria and including groups having characteristics satisfying the one or more criteria associated with the set of candidate groups. Example criteria associated with a set of candidate groups include: a topic, a location, characteristics of users associated with a group, types of connections between additional users and the user, and a distance between a location associated with the user and a location associated with a group. FIG. 4 is a process flow diagram of the social networking system 140 identifying sets of candidate groups. In the example shown by FIG. 4, the social networking system 140 identifies multiple sets of candidate groups from the group store 230, with each set of candidate groups associated with one or more criteria. As shown in FIG. 4, set 405A of candidate groups includes groups associated with a specific location, set 405B of candidate groups includes groups associated with a specific topic, and set 405C of candidate groups includes groups associated with one or more users having a specific type of connection to the user. In different embodiments, any suitable criteria may be associated with a set of candidate groups, and any number of sets of candidate groups may be generated based on information from the group store 230 One or more selected groups 410 are determined from the sets 405A, 405B, 405C of candidate groups, as further described below. In the example of FIG. 4, the selected groups 410 include a group from each of set 405A, set 405B, and set 405C.

For example, the social networking system 140 ranks candidate groups, which are each included in one or more sets of groups, based on the scores associated with the candidate groups, while accounting for sets including different candidate groups. If a candidate group and an additional candidate group are both included in a common set, the ranking is modified to lower a position of the additional candidate group in the ranking relative to the candidate group. For example, a position of the additional candidate group in the ranking is lowered. In the example from FIG. 4, a ranking of a candidate group included in the set 405A of candidate groups is reduced if another candidate group included in the set 405A of candidate groups has a higher position in the ranking. This reduces the likelihood of the selected groups 410 including a disproportionate number of sources associated with the specified location associated with the set 450A of candidate groups. Hence, a position in the ranking of a candidate group is lowered if the candidate group is included in the same set of candidate groups as another candidate group having a higher position in the ranking. By penalizing a candidate group included in a set of candidate groups that also includes another candidate group with a higher position in the ranking, the social networking system 140 includes candidate groups from a variety of sets of candidate groups in the selected groups. Because different sets of candidate groups are associated with different criteria, different sets of candidate groups include candidate groups having different characteristics, selecting 325 groups from different sets of candidate groups allows selection of groups with a wider range of characteristics. In some embodiments, a threshold number of groups from a threshold number of sets of candidate groups are selected 325.

Referring back to FIG. 3, the social networking system 140 may alternatively select 325 a threshold number of groups having different characteristics based on one or more rules. For example, the social networking system 140 selects 325 a threshold number of groups associated with maximum scores relative to other groups having a specific characteristic and also selects a threshold number of additional groups associated with maximum scores relative to other groups having an additional characteristic. In another embodiment, the social networking system 140 generates different rankings associated with different characteristics, so a ranking includes groups associated with a particular characteristic ranked based on their associated scores. Based on one or more rules, a threshold number of groups are selected from at least a threshold number of rankings associated with different characteristics.

Information identifying the selected groups is communicated 330 from the social networking system 140 to a client device 110 associated with the requesting user that presents the information to the requesting user. For example, names associated with one or more of the selected groups are communicated 330 to the client device 110. Additional information, such as one or more users connected to the requesting user and associated with a selected group, a location associated with a selected group, or content associated with a selected group (e.g., an image associated with the selected group) may be communicated 330 to the client device 110 for presentation. The information communicated 330 to the client device 110 may also include an order associated with the selected groups. For example, the selected groups are ordered based on their associated scores so they are presented by the client device 110 based on the order. In some embodiments, selected groups having higher scores have higher positions in the order. If the received request was a search query, the selected groups may be communicated to the client device 110 along with an order based on the scores associated with the selected groups; the selected groups are presented based on the order rather than an amount of similarity between topics, names, or other information associated with the selected groups and search terms in the search query. This allows the selected groups to be presented based on a likelihood of the requesting user interacting with various selected groups rather than similarity between characteristics of the selected groups and search terms to increase the likelihood of the requesting user identifying a group with which the requesting user is likely to interact.

In some embodiments, the information communicated 330 to the client device 110 organizes the selected groups based on characteristics associated with the selected groups. For example, multiple collections of selected groups are included in the information communicated to the client device 110, with each collection associated with a characteristic. In one embodiment, a collection includes selected groups associated with locations within a threshold distance of a location associated with the requesting user (e.g., a current location associated with the requesting user, a hometown associated with the requesting user). Selected groups having a characteristic are included in a collection associated with the characteristic. The client device 110 may include multiple pages or sections each associated with a collection and may present additional information associated with selected groups included in a collection selected by the user. For example, a collection may include selected groups associated with a particular location, selected groups associated with at least a threshold number of additional users connected to the requesting user, selected groups associated with a specific topic, or selected groups associated with any suitable characteristic. Additionally, the requesting user may provide an input to the client device 110 to filter the selected groups based on characteristics associated with the selected groups, allowing the requesting user to view selected groups having a specific characteristic or having a specific combination of characteristics.

Additionally, the social networking system 140 may communicate 330 information identifying the selected groups to the requesting user based at least in part on the retrieved interactions associated with the requesting user. In some embodiments, the social networking system 140 determines the requesting user has performed interactions with at least a threshold number of groups within a threshold time interval of a current time, the social networking system 140 delays communication 330 of the information identifying the selected groups by an amount of time. For example, if the requesting user has joined three groups within 12 hours of the current time, the social networking system 140 delays communicating 330 information identifying the selected groups by 2 hours to increase the likelihood of the requesting user interacting with the information identifying the selected groups (e.g., joining a selected group). Similarly, if the requesting user has hidden information identifying four groups within 12 hours of the current time, the social networking system 140 delays communicating 330 information identifying the selected groups by 5 hours to decrease the likelihood of the requesting user hiding the information identifying the selected groups. In various embodiments, the social networking system 140 determines if the requesting user has performed one or more specific types of interactions with at least a threshold number of groups within threshold time interval of a current time when determining if to delay communicating 330 the information identifying the selected groups to the requesting user. For example, the social networking system 140 determines a number of groups that the requesting user joined within a threshold time interval of a current time or a number of groups described by information that the requesting user hid during the threshold time interval of the current time and determines a time to communicate 330 information identifying the selected groups based on the determined numbers of groups. Basing communication 330 of information describing selected groups at least in part on interactions by the requesting user with various groups during a specified time interval allows the social networking system 140 to communicate the information describing the selected groups to the requesting user at a time that increases the requesting user's likelihood of interacting with the information describing the selected groups.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
    storing, by a computing system, first information describing a plurality of groups of an online system, each group in the plurality of groups including one or more users of the online system;
    acquiring, by the computing system, from a requesting user of the online system, a request to identify a set of groups;
    acquiring, by the computing system, second information describing one or more interactions between the requesting user and one or more groups in the plurality of groups;
    determining, by the computing system, based on applying a model to the one or more interactions, one or more frequencies with which the requesting user performs the one or more interactions with respect to the one or more groups;
    determining, by the computing system, based on the one or more frequencies, one or more scores for the one or more groups, each of the one or more scores representing a respective likelihood that the requesting user will interact with each of the one or more groups within a specified time interval;
    identifying, by the computing system, based on the one or more scores, at least one of the one or more groups that satisfies specified criteria; and
    selecting, by the computing system, the at least one of the one or more groups to be included in the set of groups.

2. The method of claim 1, wherein applying the model to the one or more interactions further comprises:
    associating one or more weights with the one or more interactions.

3. The method of claim 2, wherein each of the one or more interactions is performed at a respective time, and wherein each of the one or more weights is determined based on the respective time at which each of the one or more interactions is performed.

4. The method of claim 3, wherein the one or more interactions include a first interaction performed at a first time and a second interaction performed at a second time, and wherein the first time is closer to a current time than the second time, wherein the one or more weights include a first weight and a second weight, wherein the first weight is higher than the second weight, and wherein associating the one or more weights with the one or more interactions further comprises:
    associating the first weight with the first interaction; and
    associating the second weight with the second interaction.

5. The method of claim 2, wherein each of the one or more interactions is associated with a respective interaction type, and wherein each of the one or more weights is determined based on the respective interaction type associated with each of the one or more interactions.

6. The method of claim 2, wherein at least one of the one or more weights is determined based on a number or a percentage of first characteristics associated with a particular group of the one or more groups that match, within an allowable deviation, second characteristics associated with an additional group.

7. The method of claim 1, wherein the specified criteria is associated with at least one of a topic, a location, a user characteristic, or a connection between the requesting user and another entity in the online system.

8. A system comprising:
    at least one processor; and
    a memory storing instructions that, when executed by the at least one processor, cause the system to perform:
        storing first information describing a plurality of groups of an online system, each group in the plurality of groups including one or more users of the online system;
        acquiring, from a requesting user of the online system, a request to identify a set of groups;
        acquiring second information describing one or more interactions between the requesting user and one or more groups in the plurality of groups;
        determining, based on applying a model to the one or more interactions, one or more frequencies with which the requesting user performs the one or more interactions with respect to the one or more groups;
        determining, based on the one or more frequencies, one or more scores for the one or more groups, each of the one or more scores representing a respective likelihood that the requesting user will interact with each of the one or more groups within a specified time interval;
        identifying, based on the one or more scores, at least one of the one or more groups that satisfies specified criteria; and
        selecting the at least one of the one or more groups to be included in the set of groups.

9. The system of claim 8, wherein applying the model to the one or more interactions further comprises:
    associating one or more weights with the one or more interactions.

10. The system of claim 9, wherein each of the one or more interactions is performed at a respective time, and wherein each of the one or more weights is determined based on the respective time at which each of the one or more interactions is performed.

11. The system of claim 10, wherein the one or more interactions include a first interaction performed at a first time and a second interaction performed at a second time, and wherein the first time is closer to a current time than the second time, wherein the one or more weights include a first weight and a second weight, wherein the first weight is higher than the second weight, and wherein associating the one or more weights with the one or more interactions further comprises:
    associating the first weight with the first interaction; and
    associating the second weight with the second interaction.

12. The system of claim 9, wherein each of the one or more interactions is associated with a respective interaction type, and wherein each of the one or more weights is determined based on the respective interaction type associated with each of the one or more interactions.

13. The system of claim 9, wherein at least one of the one or more weights is determined based on a number or a percentage of first characteristics associated with a particular group of the one or more groups that match, within an allowable deviation, second characteristics associated with an additional group.

14. The system of claim 8, wherein the specified criteria is associated with at least one of a topic, a location, a user characteristic, or a connection between the requesting user and another entity in the online system.

15. A non-transitory computer-readable storage medium including instructions that, when executed by at least one processor of a computing system, cause the computing system to perform a method comprising:
    storing first information describing a plurality of groups of an online system, each group in the plurality of groups including one or more users of the online system;
    acquiring, from a requesting user of the online system, a request to identify a set of groups;
    acquiring second information describing one or more interactions between the requesting user and one or more groups in the plurality of groups;
    determining, based on applying a model to the one or more interactions, one or more frequencies with which the requesting user performs the one or more interactions with respect to the one or more groups;
    determining, based on the one or more frequencies, one or more scores for the one or more groups, each of the one or more scores representing a respective likelihood that the requesting user will interact with each of the one or more groups within a specified time interval;
    identifying, based on the one or more scores, at least one of the one or more groups that satisfies specified criteria; and
    selecting the at least one of the one or more groups to be included in the set of groups.

16. The non-transitory computer-readable storage medium of claim 15, wherein applying the model to the one or more interactions further comprises:
    associating one or more weights with the one or more interactions.

17. The non-transitory computer-readable storage medium of claim 16, wherein each of the one or more interactions is performed at a respective time, and wherein each of the one or more weights is determined based on the respective time at which each of the one or more interactions is performed.

18. The non-transitory computer-readable storage medium of claim 17, wherein the one or more interactions include a first interaction performed at a first time and a second interaction performed at a second time, and wherein the first time is closer to a current time than the second time, wherein the one or more weights include a first weight and a second weight, wherein the first weight is higher than the second weight, and wherein associating the one or more weights with the one or more interactions further comprises:
    associating the first weight with the first interaction; and
    associating the second weight with the second interaction.

19. The non-transitory computer-readable storage medium of claim 16, wherein each of the one or more interactions is associated with a respective interaction type, and wherein each of the one or more weights is determined based on the respective interaction type associated with each of the one or more interactions.

20. The non-transitory computer-readable storage medium of claim 16, wherein at least one of the one or more weights is determined based on a number or a percentage of first characteristics associated with a particular group of the one or more groups that match, within an allowable deviation, second characteristics associated with an additional group.

* * * * *